United States Patent [19]

Hosaka et al.

[11] Patent Number: 4,809,175
[45] Date of Patent: Feb. 28, 1989

[54] VEHICLE CONTROL SYSTEM AND METHOD THEREFOR

[75] Inventors: Takefumi Hosaka; Saitama Arai; Hiroki Matsui, all of Saitama, Japan

[73] Assignee: Honda Giken Kogyo Kabushiki Kaisha, Tokyo, Japan

[21] Appl. No.: 81,869

[22] Filed: Aug. 5, 1987

[30] Foreign Application Priority Data

Aug. 6, 1986 [JP] Japan ................... 61-186042

[51] Int. Cl.⁴ ................. B60K 31/00; G06F 15/50
[52] U.S. Cl. ..................................... 364/424; 180/170
[58] Field of Search ................ 364/424; 180/170, 176, 180/177, 179

[56] References Cited

U.S. PATENT DOCUMENTS

4,138,723  2/1979  Nehmer et al. ................... 364/424

*Primary Examiner*—Eugene R. LaRoche
*Assistant Examiner*—David Mis
*Attorney, Agent, or Firm*—Lyon & Lyon

[57] ABSTRACT

A system for electronically controlling vehicle operation vehicle and a method therefor applied to a cruise control, which utilizes fuzzy logic or approximate reasoning in determining a control output. Namely, vehicle operating conditions are assigned on a scale called a universe of discourse having degrees of 0 to 1.0 called membership functions or degrees. The detected conditions are identified on the universe and are then defined by fuzzy labels which are in turn used for retrieving control rules expressed in similar labels. Pertinent control rules are composed in fuzzy relation so as to obtain a scaled or universe value which is then converted into a real numerical value. The value is finally sent to a pulse motor control device which opens or closes a throttle valve in order to maintain the vehicle at a predetermined cruising speed.

12 Claims, 12 Drawing Sheets

| p2 \ p1 | | NB | NM | NS | ZO | PS | PM | PB |
|---|---|---|---|---|---|---|---|---|
| | m n | 1 | 2 | 3 | 4 | 5 | 6 | 7 |
| NB | 1 | $R_{11}$ | ---- | ---- | ---- | | | $R_{17}$ |
| NM | 2 | | | | | | | |
| NS | 3 | | | | | | | |
| ZO | 4 | | | | | | | |
| PS | 5 | | | | | | | |
| PM | 6 | | | | | | | |
| PB | 7 | $R_{71}$ | | | | | | $R_{77}$ |

FIG. 4

| Universe of discourse | $-n$ | ---- | $-4$ | $-3$ | $-2$ | $-1$ | $0$ | $1$ | $2$ | $3$ | $4$ | ---- | $n$ |
|---|---|---|---|---|---|---|---|---|---|---|---|---|---|
| Output O | $-O_n$ | ---- | $-O_4$ | $-O_3$ | $-O_2$ | $-O_1$ | $O_0$ | $O_1$ | $O_2$ | $O_3$ | $O_4$ | ---- | $O_n$ |

| $V_{DIF}$ FL \ $dV_{FL}$ | NB | NM | NS | ZO | PS | PM | PB |
|---|---|---|---|---|---|---|---|
| m \ n | 1 | 2 | 3 | 4 | 5 | 6 | 7 |
| NB  1 |  |  |  | PB | PM |  |  |
| NM  2 |  |  |  | PM |  |  |  |
| NS  3 |  |  | PB | PM | PS | ZO | NM |
| ZO  4 |  | PB | PM | PS | ZO | NS | NB |
| PS  5 | PM |  | ZO | NS |  |  |  |
| PM  6 |  |  |  | NM |  |  |  |
| PB  7 |  |  | NM | NB |  |  |  |

FIG. 12

| $\theta_{TH-OUT}(°)$ | -16 | -8 | -4 | -2 | -1 | -0.5 | -0.25 | 0 | 0.25 | 0.5 | 1 | 2 | 4 | 8 | 16 |
| --- | --- | --- | --- | --- | --- | --- | --- | --- | --- | --- | --- | --- | --- | --- | --- |
| Fuzzy Label \ $R_{nm}$  u \ n,m | -7 | -6 | -5 | -4 | -3 | -2 | -1 | 0 | 1 | 2 | 3 | 4 | 5 | 6 | 7 |
| NB  1 | $\mu_{OUT\,1\text{-}7}$ | --- | --- |  |  |  |  |  |  |  |  |  |  |  | $\mu_{OUT\,17}$ |
| NM  2 |  | --- | --- |  |  |  |  |  |  |  |  |  |  |  |  |
| NS  3 |  |  |  | --- |  |  |  |  |  |  |  |  |  |  |  |
| ZO  4 |  |  |  |  |  |  | $\mu_{OUT\,ij}$ |  |  |  |  |  |  |  |  |
| PS  5 |  |  |  |  |  |  |  |  |  | --- |  |  |  |  |  |
| PM  6 |  |  |  |  |  |  |  |  |  |  |  | --- | --- |  |  |
| PB  7 | $\mu_{OUT\,7\text{-}7}$ |  |  |  |  |  |  |  |  |  |  |  | --- | --- | $\mu_{OUT\,77}$ |

ROM: columns -7; RAM: columns -6 through 7

| CASE | IF | | THEN |
|---|---|---|---|
| | $V_{DIF}$ | dV | $\theta_{TH}$ |
| I | ZO | NS | PS |
| II | PS | NS | ZO |
| III | ZO | ZO | ZO |
| IV | PS | ZO | NS |

VEHICLE CONTROL SYSTEM AND METHOD THEREFOR

BACKGROUND OF THE INVENTION

1. Field of the Invention

This invention relates to a vehicle control system and a method therefor, and more particularly to a system for electronically controlling vehicle operation and a method therefor which utilizes Fuzzy Logic or Approximate Reasoning.

2. Description of the Prior Art

Vehicle devices and mechanisms that formerly were always operated manually by the vehicle operator are, more and more, being controlled automatically. An example of such automation can be seen, for instance, in the technology described in Japanese Patent Publication No. 9740/1984, which discloses a cruise control apparatus.

Such conventional automatic control has employed various techniques including proportional control, proportional-plus-integral control and proportional-plus-integral-plus-differential control. In all cases, however, the control techniques have been premised on receiving physical quantities as input values. The physical quantities are represented numerically and input to the control system as parameters indicating states of vehicle operation, whereafter a control value for regulating the portion of the vehicle to be controlled is determined in accordance with prescribed rules. In this kind of control, however, it is impossible to include among the control factors things that are difficult to express clearly as physical quantities, such as the feelings, judgments and impressions of a human being. Moreover, since in the conventional control, all of the effort goes into maintaining the target control value, the control value has to be changed so frequently that there is no room to give attention to riding comfort and other human factors. Thus, while coming closer to being able to carry out control on a level with the manual operations of the average driver, the conventional control systems are unable to simulate the driving techniques of an expert driver in terms of safety, economy or riding comfort and enjoyment. One of the reasons for this is that, as stated above, the feelings, judgments, impressions and the like of the expert driver cannot be expressed as physical quantities and thus cannot be incorporated as control factors in the systems. For the same reason, the conventional control techniques are unable to respond to the difference or diversity in the feelings among individual drivers. As a result, it has not been possible to adequately give each individual driver a feeling of oneness with the vehicle, i.e. to give him the feeling that the vehicle is an extension of himself.

Moreover, in the conventional control system control rules have become increasingly detailed year after year. Thus, when a microcomputer is used in the system, it is disadvantageously necessary to employ a memory of large capacity.

SUMMARY OF THE INVENTION

It is therefore an object of the invention to provide a unique system for electronically controlling vehicle operation and a method therefor which overcome the drawbacks of the prior art.

Another object of the invention is to provide a system for electronically controlling vehicle operation and a method therefor which open the way to the incorporation in the control of human feelings, judgments, impressions and other factors which could not be expressed as physical quantities, in this way enabling the incorporation in the control of the feelings, judgments and impressions of an expert driver during manual operation and thus opening the way for simulation in an automatic control system of the safe, economical and comfort- and enjoyment-producing driving techniques of the expert driver.

Still another object of the invention is to provide a system for electronically controlling vehicle operation and a method therefor which, by opening the way to the possibility of reflecting the difference and diversity in the feelings of individual drivers without need to make changes in the rules, make it possible to enhance the feeling of each individual driver that the vehicle is an extension of himself.

A further object of the invention is to provide a system for electronically controlling vehicle operation and a method therefor which, by enabling fine control to be expressed by simple rules, make it possible to minimize the memory capacity required when carrying out the control using a microcomputer.

For realizing the aforesaid objects, according to a first aspect of the invention there is provided a method for controlling vehicle operation, which comprises, assigning operating conditions of the vehicle on a scale in advance in accordance with a predetermined first principle while establishing degrees thereof, identifying a position on the scale to determine the degree and carrying out a predetermined calculation with respect to the degree, selecting or averaging the calculation result in accordance with a predetermined second principle so as to determine a control value corresponding to the selected or averaged value, and controlling the vehicle operation on the basis of the value.

According to a second aspect of the invention there is provided an improved system for controlling vehicle operation, which comprises means for detecting operating conditions of the vehicle disposed at an appropriate part of the vehicle, means for receiving the output of the detecting means and for calculating a control value required for vehicle operation, and means for receiving the output of the calculating means and for driving a device required for vehicle operation, said calculating means identifying a current position on a scale onto which operating conditions have been assigned with a degree and calculating a control value with respect to the degree in accordance with a predetermined principle.

BRIEF DESCRIPTION OF THE DRAWINGS

These and other objects and advantages of the invention will be more apparent from the following description and drawings, in which.

DESCRIPTION OF THE PREFERRED EMBODIMENTS

Figure 17:
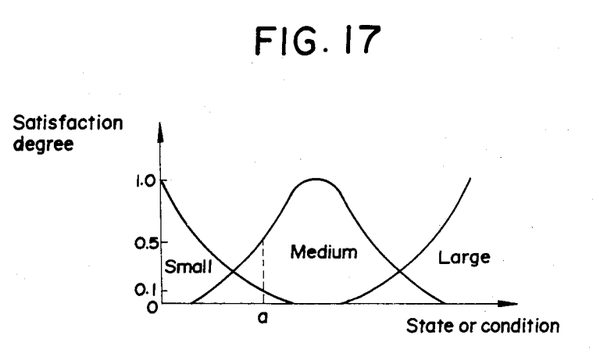
FIG. 17 is a graph for explaining the theoretical basis of the invention.

To facilitate understanding of the invention and its embodiments, an explanation will first be given regarding the premises on which the invention is based. Usually a given state or condition is represented in terms of a physical value. However, it is also possible to represent a state in mathematical terms of sets, as is illustrated in FIG. 17. For example, a state can be perceived as divided into three subsets: small, medium and large. In this case, if one subset is indisputably satisfied, its degree can be defined as "1" whereas its indisputable failure to be satisfied is defined as "0". It may also be possible to define intermediate degrees of satisfaction as 0.5, 0.7 . . . . Thus, as shown in the figure, a specific condition a can, for instance, be said to have a degree of satisfaction in the "medium" subset of 0.5 but a degree in the "small" subset of only 0.1. This type of thinking falls within the scope of Fuzzy Set Theory or Approximate Reasoning. When applied to a system for vehicle operation, for example, the Fuzzy Set Theory is not only capable of handling conventional physical quantities but also makes it possible, through psychological and statistical analysis, to introduce as factors indicating operating conditions such non-physical, subjective feelings and impressions as "drivability" or "steering response", and thus opens the way to the use of such impressions and feelings of a human being in the control of vehicle operation. The present invention relates to a system for electronically controlling vehicle operation and a method therefor which utilize the Fuzzy Logic or Approximate Reasoning.

Figure 1:
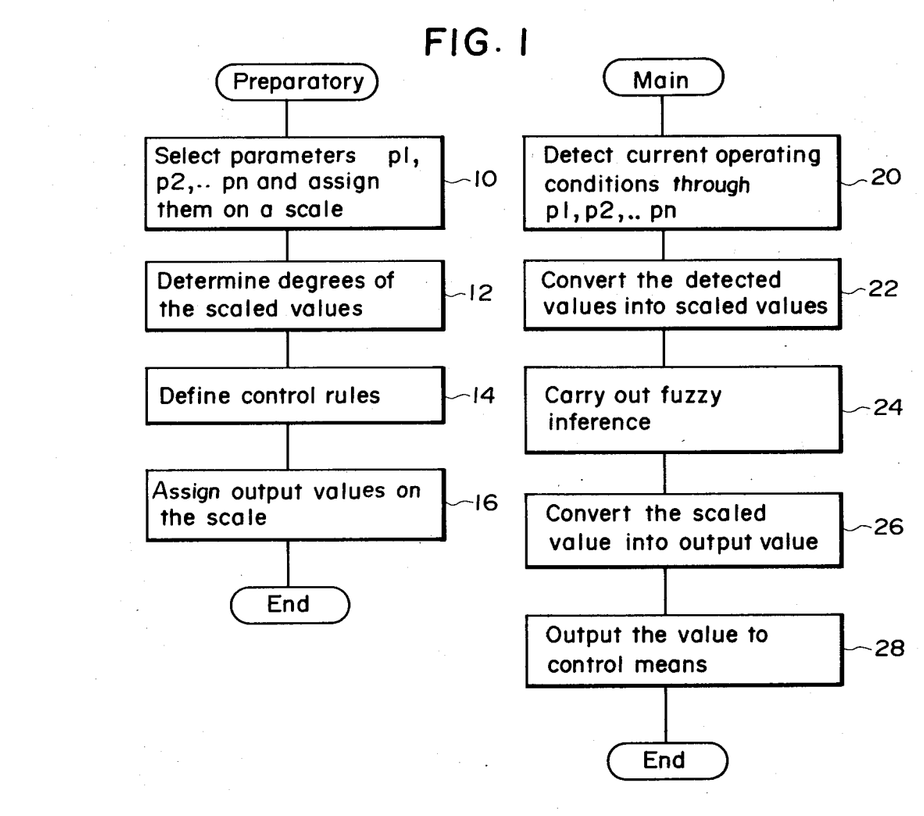
FIG. 1 is a flowchart showing a vehicle operation method according to the invention.

Before going into structural details of a system embodying the present invention, there follows now a short discussion of what have been meant in the preceding descriptions in the SUMMARY OF INVENTION with reference to the flowchart of FIG. 1.

Figure 2:
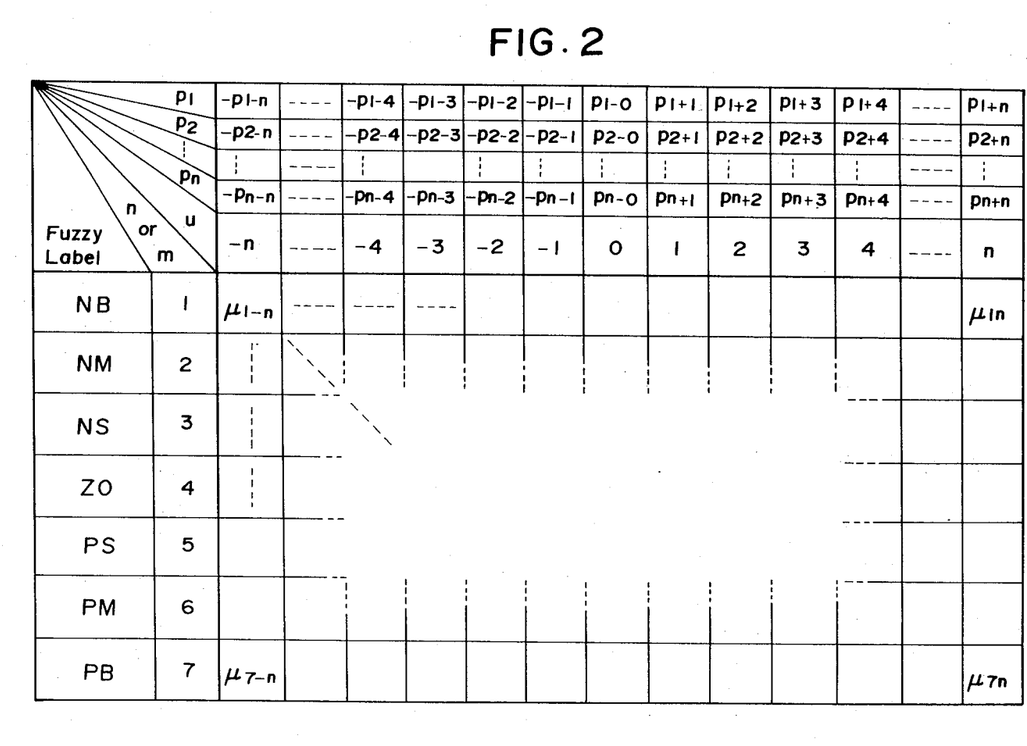
FIG. 2 is a membership map prepared in a preparatory routine in the flowchart of FIG. 1 for converting vehicle operating conditions to scaled values.

The flowchart comprises a preparatory routine program prepared in advance before entering actual vehicle operation control and a main routine program used in the actual control. In the preparatory routine, first in step 10, appropriate parameters $p_1, p_2, \ldots p_n$ indicating vehicle operating conditions are selected. The parameters are not limited to physical quantities and it is also possible to use data related to the aforesaid human impressions and the like after these have been psychologically analyzed and put into usable form by use of statistical methods. The operating conditions represented by the parameters are assigned on a scale named a "universe of discourse" in a manner such that, for example, they extend from the smallest operating condition region to the largest. FIG. 2 shows a chart (referred to as a membership map hereinafter) thus obtained. More specifically, the operating conditions are divided into an appropriate number of subdivisions on the universe of discourse (this number equaling $2n+1$, wherein n is a positive integer). Further, as shown in FIG. 2, the column at the left side of the map contains subsets called fuzzy labels NB to PB, where NB means Negative Big, NM means Negative Medium, NS means Negative Small, ZO means Zero, PS means Positive Small, PM means Positive Medium and PB means Positive Big. The number of labels can be increased or decreased as desired. In step 12, in responsive with the membership degree the column of each subdivision on the universe is assigned numerical values $\mu$ ranging from 0 to 1.0, which are called membership functions or degrees.

Figure 3:
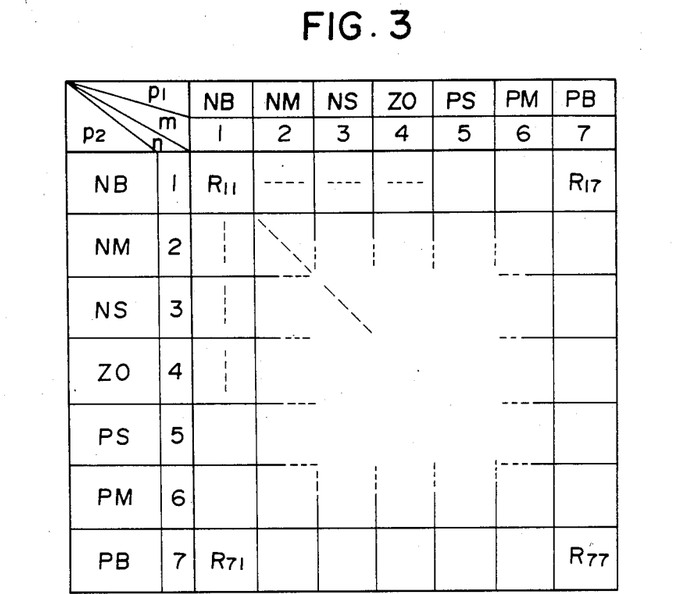
FIG. 3 is a rule table indicating control rules expressed in fuzzy labels which is also prepared in the preparatory routine in the flowchart of FIG. 1.
Figure 4:
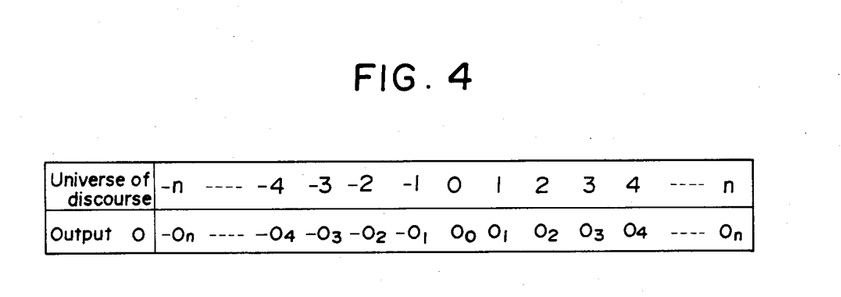
FIG. 4 is a conversion table that is used for converting a calculated scaled value to a real output value, which is similarly prepared in the preparatory routine in the flowchart of FIG. 1.

Then in step 14, control rules are determined. In the fuzzy control method of this invention, the control rules are also expressed using fuzzy labels and for example, are expressed in a form such as IF $p_1=PB$ AND $p_2=ZO$, THEN output$=NB$ (meaning that if parameter $p_1$ is large in the positive direction and parameter $p_2$ is zero, then the control output is to be made large in the negative direction). For making it easy to retrieve the related control rules, there is used a table (called a rule table) as shown in FIG. 3. In the Figure, the THEN portion defining output in fuzzy labels are expressed as R11 to R77 which can be retrieved from the detected parameters $p_1, p_2$ expressed similarly in fuzzy labels. Here it should be noted that when there are used three or more parameters, they are appropriately combined in pairs and additional tables will be prepared. In the last step 16 of the preparatory routine, control output o are similarly assigned on the same scale on the universe of discourse as shown in FIG. 4. These maps or tables referred in steps 10 to 16 are obtained through experiments and must be prepared prior to entering into the main routine program where an actual control value will be determined as explained later.

The procedure in the main flowchart begins at step 20 in which current vehicle operating conditions are detected through the parameters $p_1, p_2, \ldots p_n$. The procedure then moves to step 22 in which the parameters $p_1, p_2, \ldots p_n$ are converted into values u on the universe of discourse and the column of the subdivisions corresponding to the detected parameter values are identified in order to find out the position on the scale where the current operating conditions reside.

Figure 5:
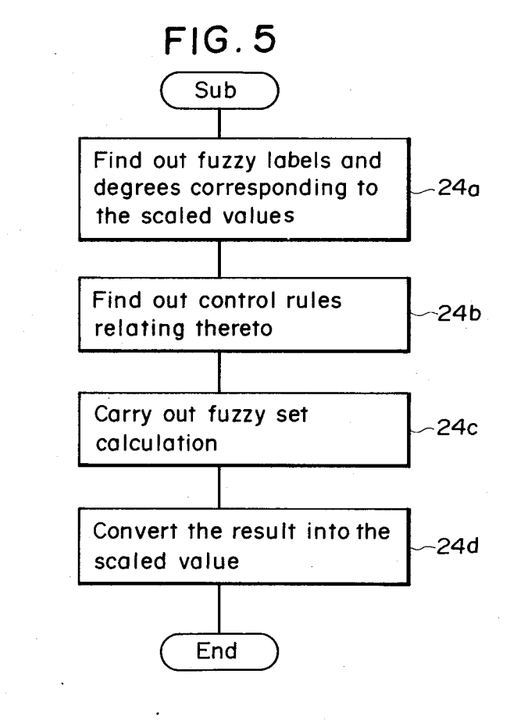
FIG. 5 is a flowchart showing a subroutine for one of the steps of the flowchart of FIG. 1.
Figure 6:
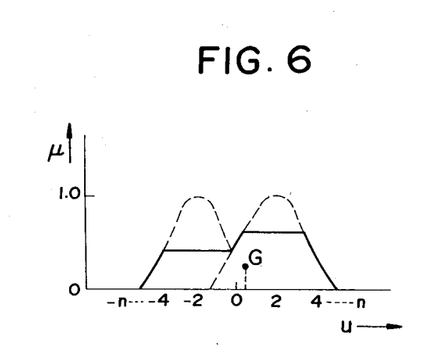
FIG. 6 is a graph indicating fuzzy set calculation carried out in the flowchart shown in FIG. 5.

The procedure next advances to step 24 where fuzzy inference is conducted. This consists of expressing the current operating conditions using fuzzy labels while retrieving the rules therefrom and determining a control output. FIG. 5 shows a subroutine for carrying out this fuzzy inference. In step 24a of this subroutine, the fuzzy labels and the membership degrees are read out based on the position or value u on the universe to which the detected parameters correspond. Next in step 24b, the control rules relating to the read-out fuzzy labels are retrieved using the table shown in FIG. 3. The rules are similarly expressed in fuzzy labels. The procedure then moves to step 24c where fuzzy set calculation is carried out. Since the fuzzy labels are graphically expressed in a triangular or convex waveform as shown in FIG. 6, this means comparing the waveforms of the respective fuzzy labels concerned, using the smallest value as the basis for truncating the waveforms for the respective fuzzy labels of the THEN portions concerned among those indicated at R11 to R77 in the rule table of FIG. 3, and composing or summing the results so as to select the maximum value. In the following step 24d, the value derived in the preceding step is converted to a scaled value. This means that the composed waveform of FIG. 6 is converted to a numerical value on the universe of discourse. The conversion to the value a is carried out, for example, by determining the center of gravity G, although it is also possible to make the determination by other methods such as by simply finding the peak of the waveform, by determining the center of the peak if the peak is flat, or by determining the midpoint between the extreme values if the waveform has many peaks.

Returning to the main routine of FIG. 1, the procedure next moves to step 26 in which the value on the universe is converted to a crisp control value (real numerical value). As was already shown in FIG. 4, this is done by use of the output conversion table appropriately prepared in advance. Finally, in step 28, the control value is output to controlled means to control the vehicle operation. Thus, as is clear from the foregoing, the present invention determines the control rules based on input control parameters expressed in terms of fuzzy logic.

An embodiment of the invention as applied to vehicle cruise control will now be explained.

Figure 7:
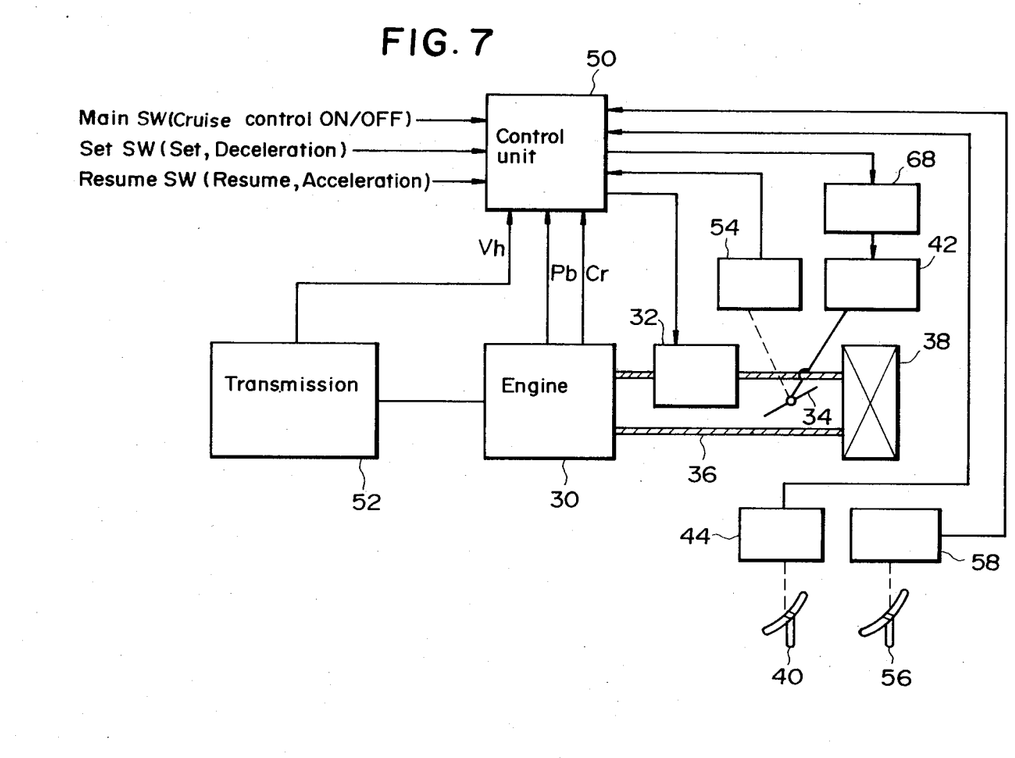
FIG. 7 is a schematic view of an example in which the invention is applied in a system for vehicle cruise control.

FIG. 7 is an overall schematic view of the cruise control system. In the figure, the reference numeral 30 denotes an engine which is supplied with fuel by a fuel injection device 32 located downstream of a throttle valve 34 provided in an intake air passage 36 which has an air cleaner 38 at its upstream end. The throttle valve 34 is electrically linked with an accelerator pedal 40 located on the floor of the vehicle at the operator's seat, and is mechanically linked to a pulse motor 42 by which it is driven to open and close. The accelerator pedal 40 has an accelerator switch 44 which is turned on when the operator depresses the accelerator pedal 40. Further, a crankshaft angle sensor (not shown) is provided in the vicinity of a rotating member of the engine 30 and a pressure sensor (not shown) is provided at an appropriate location in the intake air passage 36. These sensors detect the engine crankshaft angle Cr and the absolute pressure Pb of the intake air and send signals representing the detected values to a control unit 50.

The stage following the engine 30 is a power transmission device 52, which may be a gearbox. A vehicle speed sensor (not shown) is provided in the vicinity of a rotating member of the speed-change mechanism of the power transmission device 52 and sends vehicle speed signals Vh to the control unit 50. At an appropriate location near the vehicle steering wheel (not shown) there is further provided a main switch for issuing commands to start and stop the cruise control, a set switch for issuing commands for setting a desired vehicle speed and for deceleration, and a resume switch for issuing commands for resuming cruise control and for acceleration. These switches are operated by the vehicle operator and the ON/OFF signals therefrom are sent to the control unit 50. In the vicinity of the throttle valve 34 there is provided a throttle sensor 54 which senses the degree of opening of the throttle valve 34 and sends a corresponding signal to the control unit 50. A brake pedal 56 disposed at the side of the accelerator pedal 40 is provided with a brake switch 58 which sends a signal to the control unit 50 when the brake pedal 56 is depressed.

Figure 8:
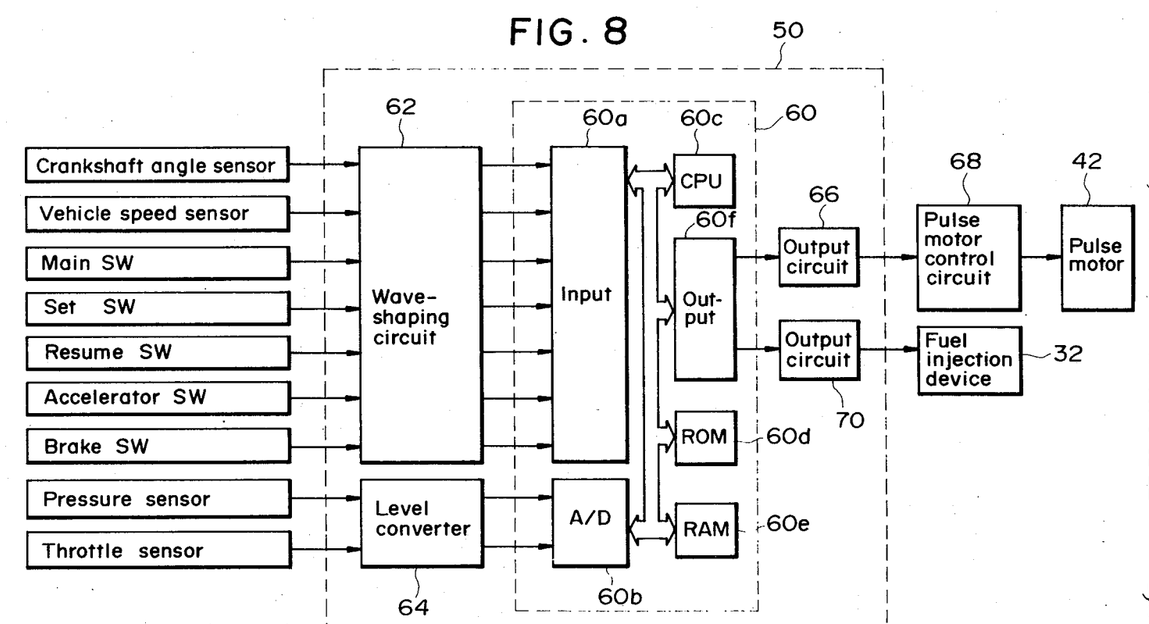
FIG. 8 is a block diagram of the control unit in the system of FIG. 7.

A block diagram of the control unit 50 is shown in FIG. 8. The control unit 50 is constituted mainly of a microcomputer 60 which comprises an input panel 60a, an A/D (analog/digital) converter 60b, a CPU (central processing unit) 60c, a ROM (read-only memory) 60d, a RAM (random access memory) 60e and an output panel 60f. As shown in the figure, the outputs of the crankshaft angle sensor, the vehicle speed sensor and the group of switches are input to the control unit 50 where they are first shaped by a wave-shaping circuit 62 and then input to the microcomputer 60 via the input panel 60a. The outputs from the pressure sensor and the throttle sensor 54 are also input to control unit 50 where they are converted to a prescribed level in a level converter 64 and then input to the microcomputer 60 through the A/D converter 60b. The microcomputer 60 computes the control value on the basis of the aforesaid input signals in a manner explained later and sends it through an output circuit 66 as a command signal a pulse motor control circuit 68 which drives the pulse motor 42 so as to open and close the throttle valve 34. The control value is also forwarded through a second output circuit 70 to the fuel injection device 32 for controlling the same.

The operation of the control unit 50 will now be explained with respect to FIGS. 9 to 16.

Figure 9:
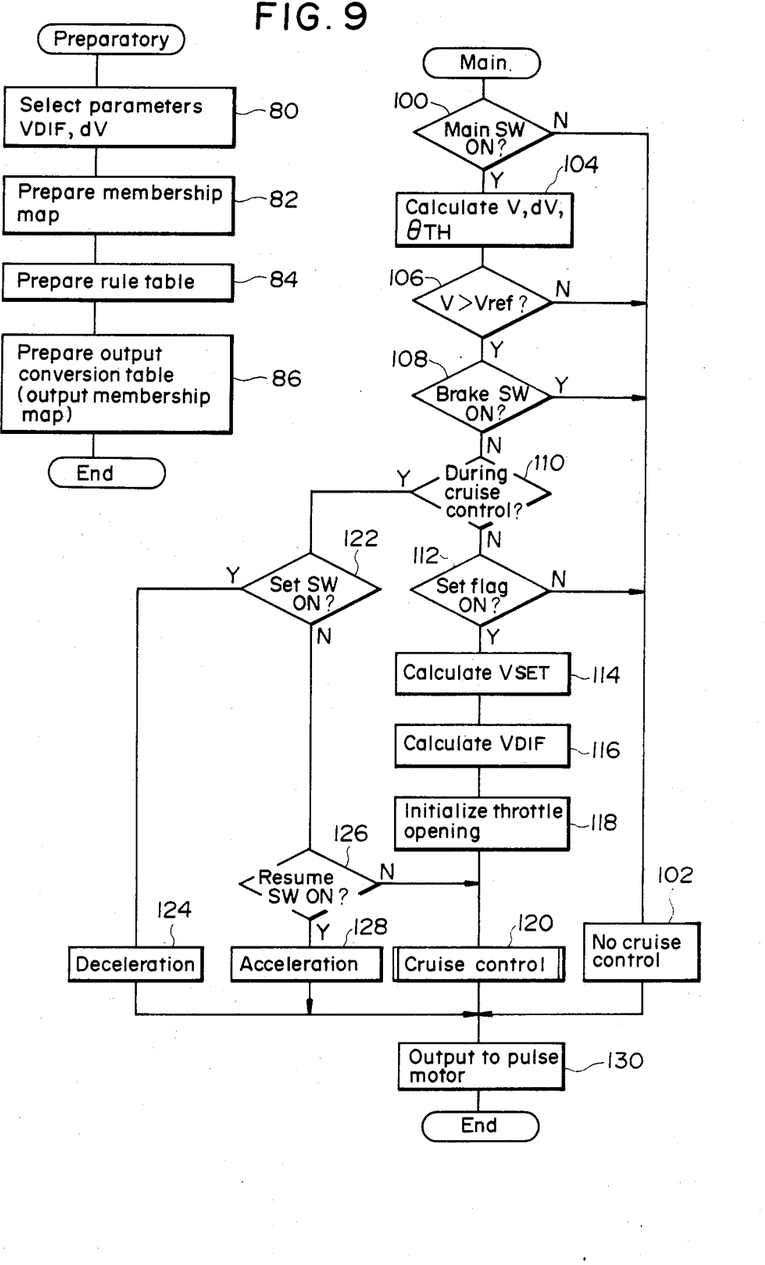
FIG. 9 is a flowchart showing the operation of the control unit shown in FIG. 8.
Figure 10A:
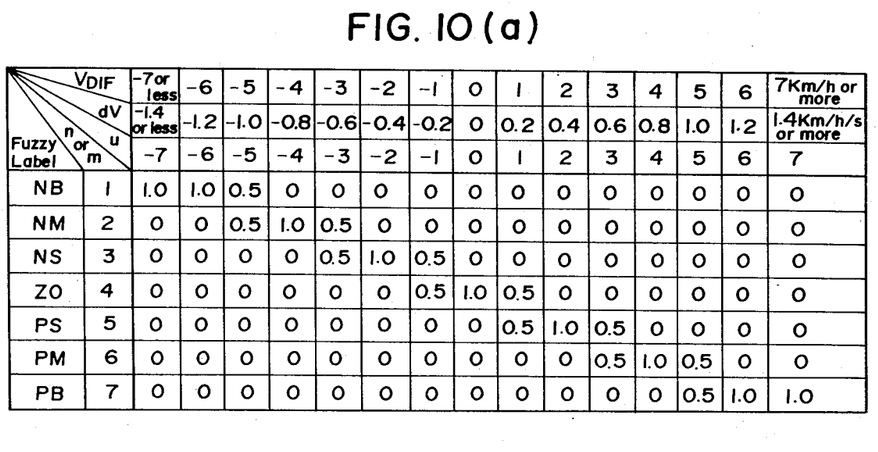
FIG. 10(a) is a membership map prepared in a preparatory routine in the flowchart of FIG. 9.
Figure 10B:
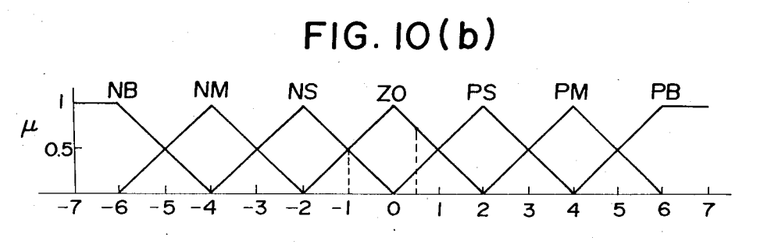
FIG. 10(b) is a graphic representation of the map shown in FIG. 10(a)
Figure 11:
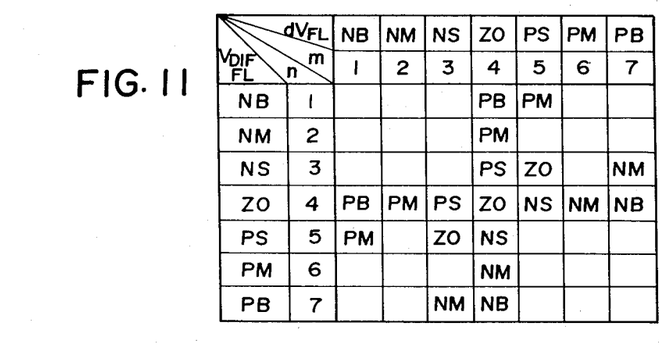
FIG. 11 is a rule table prepared in the preparatory routine in the flowchart of FIG. 9.
Figure 12:
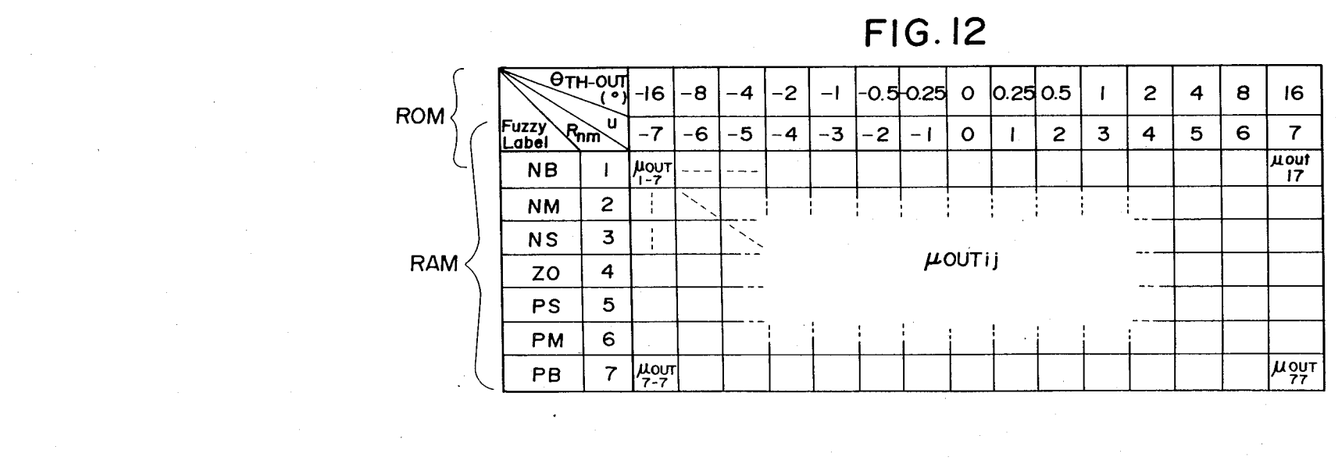
FIG. 12 is a conversion table for output, which includes an output membership map prepared in the preparatory routine in the flowchart of FIG. 9.

FIG. 9 is a flowchart which has, similarly to FIG. 1, a preparatory routine and a main routine for the cruise control. In the preparatory routine, firstly in step 80 operating parameters, i.e. vehicle speed difference VDIF and vehicle acceleration dV, which will be explained in more detail at a later stage, are selected. Next in step 82, a membership map for the parameters is defined as illustrated in FIG. 10(a), which is similar to that shown in FIG. 2. And in steps 84 and 86, a rule table and an output conversion table are prepared as shown in FIGS. 11 and 12 as was encountered formerly. The output conversion table includes an output membership map in its central portion.

Then the procedure in the main routine starts at step 100 where it is determined whether or not the main switch is ON and if it is not, cruise control is not carried out (step 102). When it is determined that the main switch is ON, the procedure moves to step 104 where the amount of throttle valve opening $\theta$TH is determined from the output of the throttle sensor 54, and the vehicle speed V and vehicle acceleration dV are computed on the basis of the output of the vehicle speed sensor. The vehicle speed V is computed on the basis of the average output value of the vehicle speed sensor over a prescribed time period, and the acceleration dV is computed from the difference between the current vehicle speed and the vehicle speed a predetermined period of time earlier.

Next, in the following step 106, it is determined whether or not the vehicle speed V computed in the preceding step is greater than a ore scribed vehicle speed Vref, which may, for example, be 20 km/h, and when it is, the procedure moves to step 108 where it is determined whether or not the brake switch is ON. In these steps, when it is found that the vehicle speed V is not greater than the prescribed vehicle speed Vref or when it is found that the brake switch is ON, cruise control is not carried out (step 102).

In the following step 110 it is determined whether or not cruise control is currently being conducted, and when it is not, the procedure moves to step 112 where it is determined whether or not a set flag is ON. If the set flag is ON, the procedure goes to step 114 where the vehicle speed V at that instant is read as the set vehicle speed VSET and in the ensuing step 116 the difference between the set vehicle speed VSET and the vehicle speed V detected in step 104 is computed as the vehicle speed difference VDIF. Then in step 118 the amount of throttle valve opening $\theta$TH is set to a target value. What this amounts to is an initializing operation carried out prior to cruise control for opening the throttle valve to an amount corresponding to the set vehicle speed VSET. This is necessary because when the operator pushes the set switch and immediately takes his foot off the accelerator pedal, the throttle valve may open rapidly depending on the condition of the road on which the vehicle is traveling. The procedure then advances to step 120 where the shift to cruise control is made. This will be explained with reference to the flowchart of FIG. 13 which shows a subroutine for cruise control. Still, however, regarding the main routine of FIG. 9, it should be noted that when it is determined in step 110 that cruise control is currently in progress, the procedure moves to step 122 where it is determined whether or not the set switch is ON and if it is, deceleration control is carried out in step 124. When it is determined in step 122 that the set switch is not ON, the procedure moves to step 126 where it is determined whether or not the resume switch is ON, and if it is, acceleration control is conducted (step 128). and if it is not, the control mode is shifted over to cruise control. Further, when it is determined in step 112 that the set flag is not ON, cruise control is not conducted (step 102). As the gist of the present invention resides in the cruise control conducted mainly in the step 120, explanation of the main flowchart will be left at this.

Figures 13, 14:
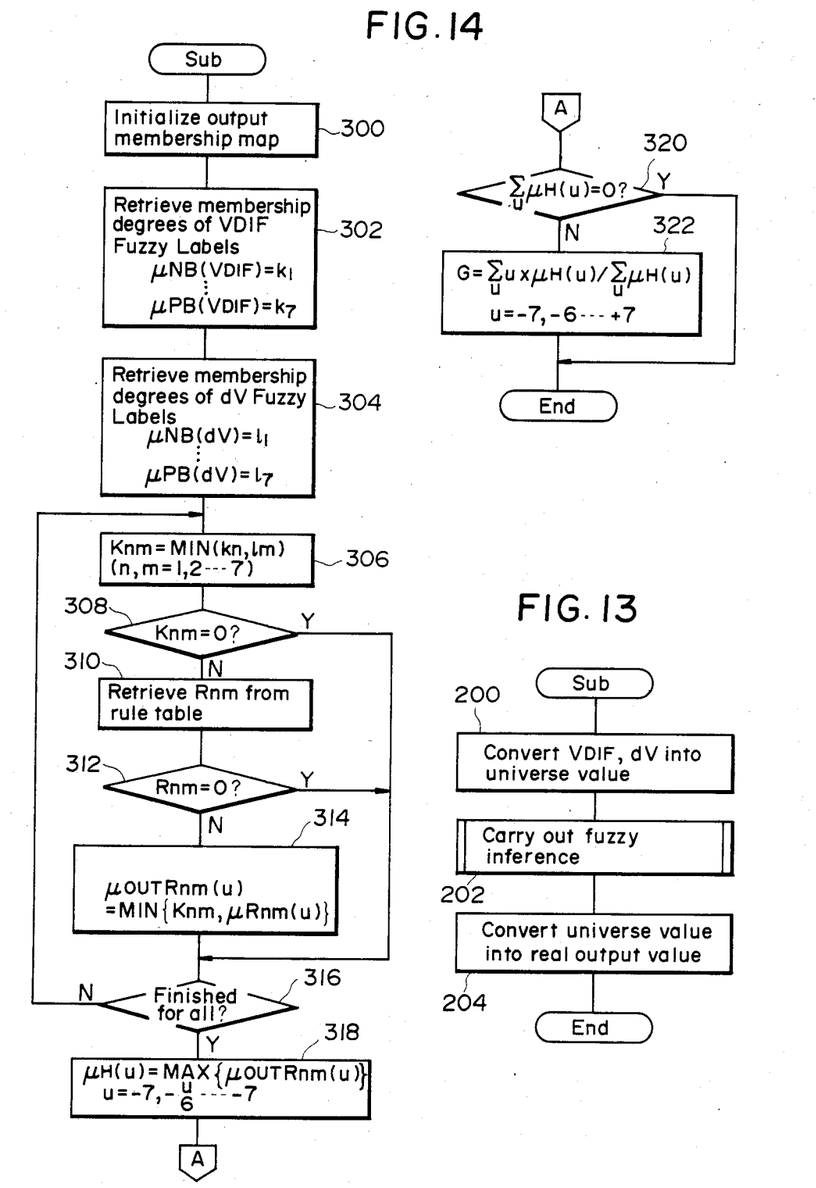
FIG. 13 is a flowchart showing a subroutine of the flowchart of FIG. 9.
FIG. 14 is a flowchart showing a subroutine of the flowchart of FIG. 13.

FIG. 13 shows a subroutine for the cruise control carried out in the step 120 of the flowchart of FIG. 9. The procedure of the subroutine starts in step 200 where the detected vehicle speed difference VDIF and the vehicle acceleration dV are converted to a value u on the universe of discourse. As parameters for the cruise control, only two physical quantities, namely the vehicle speed difference VDIF and the vehicle acceleration dV are used in this embodiment. FIG. 10(a) shows the membership map used for conversion of the parameters to scaled values. More specifically, the universe of discourse is defined as extending from $-7$ to $+7$, namely over 15 subdivisions each of which is assigned a column in the map. (Needless to say, the columns are not discontinuous but there is continuity between the columns so that, as will be explained later, intermediate values can be calculated by interpolation or the like.) As shown in FIG. 10(a), as regards the vehicle speed difference VDIF, values ranging from not more than $-7$ km/h to not less than $+7$ km/h are associated with the columns (subdivisions) on the universe ranging from $-7$ to $+7$, while as regards the acceleration dV, values ranging from not more than $-1.4$ km/h/s to not less than $+1.4$ km/h/s (change per second in speed per hour) are associated with the same columns. Here a negative value of vehicle speed difference VDIF indicates that the actual vehicle speed V is smaller than the set vehicle speed VSET, while a negative value of acceleration dV indicates deceleration. Further, as shown in the same figure, the universe is assigned fuzzy labels NB to PB and, in correspondence to these labels, each column is assigned a membership degree $\mu$ of between 0 and 1.0, inclusive. This relationship is shown graphically in FIG. 10(b). Therefore in step 200, the positions or values on the universe are determined on the basis of the detected vehicle speed difference VDIF and acceleration dV. The procedure then moves to step 202 where fuzzy inference is carried out. FIG. 14 is a flowchart showing the subroutine for conducting this inference.

Figure 15:
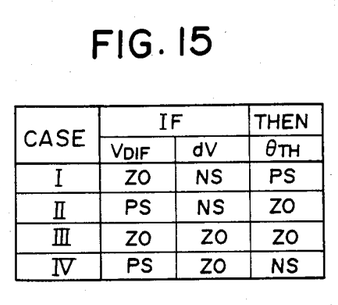
FIG. 15 is a table showing pertinent control rules retrieved in a concrete example.

For ease of understanding, an explanation will first be given with regard to a specific situation. Assume that the detected vehicle speed difference VDIF is 0.5 km/h and the detected acceleration dV is $-0.2$ km/h/s. Then as shown by the graph in FIG. 10(b), the corresponding values u on the universe are 0.5 and $-1.0$. (While there is no column in the map of FIG. 10(a) for the value 0.5. this value can be obtained by interpolation between the 1.0 and 0 columns.) When a line is drawn vertically upward from the value 0.5, it is found to intersect triangular representations of fuzzy labels ZO and PS, while a similar line drawn from $-1.0$ is found to intersect the representations of fuzzy labels NS and ZO. Next, referring to the rule table of FIG. 11 for the case where the fuzzy labels for the vehicle speed difference VDIF are ZO and PS and those for the acceleration dV are NS and ZO, it will be understood that, as shown in FIG. 15, the possible combinations give the following control rules.

| Case | IF | | THEN |
|---|---|---|---|
| | VDIF | dV | $\theta$TH-OUT |
| I. | ZO | NS | PS |
| II. | PS | NS | ZO |
| III. | ZO | ZO | ZO |
| IV. | PS | ZO | NS |

Case I, for example, means that if the vehicle speed difference VDIF is zero and the acceleration dV is small in the negative direction (when there is slight deceleration), then the amount of throttle valve opening $\theta$TH-OUT should be made small in the positive direction. In the control system according to this invention, since fuzzy sets are used, there will ordinarily be more than one pertinent control rule for a given situation.

Figure 16:
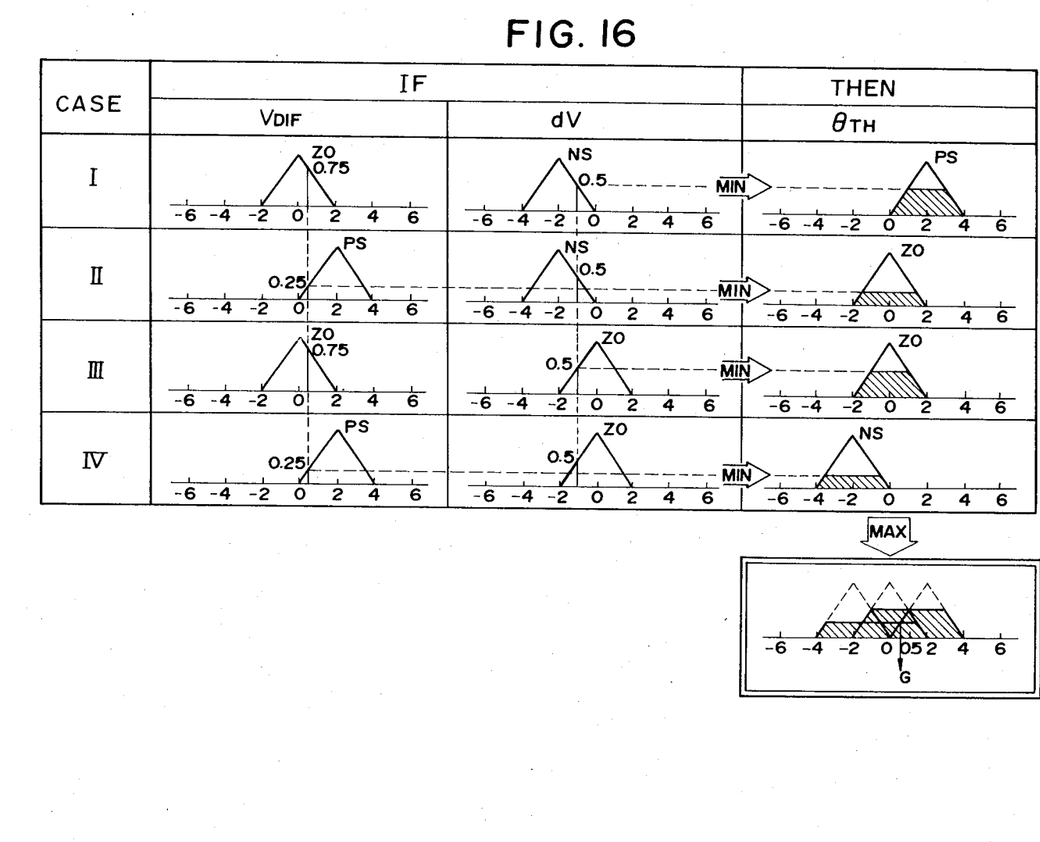
FIG. 16 is an explanatory view showing fuzzy relational composition based on these control rules.

Next, as illustrated in FIG. 16, for each of Cases I to IV the triangular representations of the fuzzy labels of the IF portion are compared, a minimum value is selected and the minimum value is used for truncating the triangular representation of the THEN portion. Taking Case I for example, if in the fuzzy label ZO of the vehicle speed difference VDIF a line is drawn vertically upward from the position 0.5 on the universe, it will intersect the triangular representation at a membership degree $\mu$ of 0.75. The similarly obtained membership degree $\mu$ for the acceleration dV is 0.5. The smaller of these, i.e. 0.5, is then selected and used as the height at which to truncate the triangular representation of the fuzzy label PS of the THEN portion. These operations are carried out successively for all 4 sets of triangular representations and the remaining base portions (hatched portions) obtained in this way from the triangular representations of the labels PS, ZO, ZO and NS are then superposed on the universe in the manner of obtaining the largest common divisor. (See the bottom of FIG. 16.) The desired control value is within the so-obtained composite hatched portion. In order to obtain a specific numerical value, the center of gravity G of the composite hatched portion is determined and a line is drawn vertically downward therefrom. The value u at the point where this vertical line intersects the universe is taken as the control value, which in this example is about 0.5. Reference is then made to the conversion table including output membership map shown in FIG. 12 in order to determine the output value θTH-OUT, namely the amount of throttle valve opening is determined as 0.125 degree. Finally, the so-determined output value is forwarded to the pulse motor control circuit 68 to open or close the throttle valve 34.

What has just been explained with reference to a specific example will now be explained with reference to the subroutine flowchart of FIG. 14. In its first step 300 the output membership map is initialized. As shown at the left side of FIG. 12, the table for conversion between the values u on the universe and the output θTH-OUT is stored in the ROM 60d of the microcomputer 60. What is meant in this step is the central portion of the figure into which values of μOUTij will be written, is set to zero. While the central portion is stored in the RA 60e of the microcomputer 60, all that is done in this step is to secure space within the RAM 60e for computation of this map portion. Thus, the initial value is set to zero.

The procedure then moves to step 302 where the membership values from μNB(VDIF)=k1 to μPB(VDIF)=k7 with respect to all fuzzy labels of the vehicle speed difference VDIF are retrieved. Similarly in the following step 304, the membership values from μNB(dV)=11 to μPB(dV)=17 with respect to all fuzzy labels of the acceleration dV are retrieved. In the case of the example given earlier this would mean that since the acceleration dV fell in the −1.0 column on the universe, all values in the column (0, 0, 0.5, 0.5, 0, 0, 0) would be read out. The procedure then moves to step 306 where the respective minimum values, Knm=MIN (kn, lm) (n, m=1, 2, ... 7). are compared and the smallest is selected. This corresponds to the comparison of the heights of the triangular representations in the example described earlier. It should be noted, however, that while in the example only the four sets of the pertinent fuzzy labels were read out, in the actual calculation according to this flowchart all membership degrees μ are once read out in the steps 302 and 304 irrespective of whether or not they are pertinent, whereafter the comparison of heights is then completed in advance in this step 306.

The procedure then advances to step 308 where it is judged whether or not the result of the comparison is zero. If it is not, the procedure moves to step 310 where the fuzzy label numbers n, m are used for reading the rule table shown in FIG. 11 and retrieving fuzzy labels Rnm corresponding to the output THEN portion. One characteristic feature of the control system according to this invention is that the control rules are expressed as fuzzy labels, which means that even though only a small number of rules is required (19 in this embodiment) it is still possible to realize fine cruise control for the vehicle. The rules are shown in the rule table of FIG. 11 and are further explained below. Where a cell in the table is left empty, this indicates that no rule exists, and in actual practice a zero is inserted in the cell.

|  | IF | | THEN |
|---|---|---|---|
|  | VDIF | and dV | θTH-OUT |
| 1. | NB | ZO | PB |

(If the actual vehicle speed is much smaller than the set vehicle speed and the acceleration is zero, then open the throttle valve by a great amount.)

| 2. | NB | PS | PM |

(If the actual vehicle speed is much smaller than the set vehicle speed and the vehicle is accelerating slightly, then open the throttle valve by a moderate amount.)

| 3. | NM | ZO | PM |

(If the actual vehicle speed is moderately smaller than the set vehicle speed and the vehicle acceleration is zero, then open the throttle valve by a moderate amount.)

| 4. | NS | ZO | PS |

(If the actual vehicle speed is slightly smaller than the set vehicle speed and the vehicle acceleration is zero, then open the throttle valve by a small amount.)

| 5. | NS | PS | ZO |

(If the actual vehicle speed is slightly smaller than the set vehicle speed and the vehicle is accelerating slightly, then leave the throttle valve as it is.)

| 6. | NS | PB | NM |

(If the actual vehicle speed is slightly smaller than the set vehicle speed and the vehicle is accelerating greatly, then close the throttle valve by a moderate amount.)

| 7. | ZO | NB | PB |

(If the vehicle speed difference is zero and the vehicle is decelerating greatly, then open the throttle valve by a large amount.)

| 8. | ZO | NM | PM |

(If the vehicle speed difference is zero and the vehicle is decelerating moderately, then open the throttle valve by a moderate amount.)

| 9. | ZO | NS | PS |

(If the vehicle speed difference is zero and the vehicle is decelerating slightly, then open the throttle valve by a small amount.)

| 10. | ZO | ZO | ZO |
|---|---|---|---|

(If the vehicle speed difference is zero and the vehicle acceleration is zero, then leave the throttle valve as it is.)

| 11. | ZO | PS | NS |
|---|---|---|---|

(If the vehicle speed difference is zero and the vehicle is accelerating slightly, then close the throttle valve by a small amount.)

| 12. | ZO | PM | NM |
|---|---|---|---|

(If the vehicle speed difference is zero and the vehicle is accelerating moderately, then close the throttle valve by a moderate amount.)

| 13. | ZO | PB | NB |
|---|---|---|---|

(If the vehicle speed difference is zero and the vehicle is accelerating greatly, then close the throttle valve by a large amount.)

| 14. | PS | NB | PM |
|---|---|---|---|

(If the actual vehicle speed is slightly larger than the set vehicle speed and the vehicle is decelerating greatly, then open the throttle valve by a moderate amount.)

| 15. | PS | NS | ZO |
|---|---|---|---|

(If the actual vehicle speed is slightly larger than the set vehicle speed and the vehicle is decelerating slightly, then leave the throttle valve as it is.)

| 16. | PS | ZO | NS |
|---|---|---|---|

(If the actual vehicle speed is slightly larger than the set vehicle speed and the vehicle acceleration is zero, then close the throttle valve by a small amount.)

| 17. | PM | ZO | NM |
|---|---|---|---|

(If the actual vehicle speed is moderately larger than the set vehicle speed and the vehicle acceleration is zero, then close the throttle valve by a moderate amount.)

| 18. | PB | NS | NM |
|---|---|---|---|

(If the actual vehicle speed is much larger than the set vehicle speed and the vehicle is decelerating slightly, then close the throttle valve by a moderate amount.

| 19. | PB | ZO | NB |
|---|---|---|---|

(If the actual vehicle speed is much larger than the set vehicle speed and the vehicle acceleration is zero, then close the throttle valve by a large amount.)

Next the procedure moves to step 312 where it is determined whether or not the THEN portion corresponding to the fuzzy labels Rnm is zero, i.e. whether a THEN portion exists. If it is not zero, the procedure advances to step 314 where the output membership map of FIG. 12 is used to calculate the output membership degree $\mu$OUT corresponding to Rnm. In the four sets each consisting of three triangular representations shown in FIG. 16, this operation corresponds to using the minimum value selected in the step 306 for truncating the triangular representations of the THEN portions. The operation is repeated for all pertinent control rules (step 316). In the step 308, when it is found that the minimum value Knm is zero, since this means that no IF portion of a control rule exists, the computation is discontinued and the procedure skips to step 316. Step 314 is also skipped in the case where Rnm is found to be zero in step 312 since this means that the control rule has no THEN portion.

Next, in step 318, the computed values are synthesized. In the example given this amounts to superposing the 4 truncated triangular representations on the universe to obtain a composite waveform as shown in FIG. 16, and then computing $\mu$H(u). The procedure then advances to step 320 where it is determined whether or not the value $\mu$H(u) is zero and if it is not, the center of gravity G is determined in the following step 322. This is done in the manner of finding a weighted average value. If $\mu$H(u) is found to be zero in step 320, since this means that no THEN portion exists, the calculation for finding the center of gravity is not carried out.

Again returning to the flowchart of FIG. 13, after the fuzzy inference has been completed in the step 202, the procedure moves to step 204 where conversion to output value $\theta$TH-OUT is carried out. This is done using the output conversion table shown in the upper portion in FIG. 12 stored in the ROM 60d.

Then returning to the main routine flowchart of FIG. 9, the procedure advances to step 130 where the aforesaid converted value is used as the output sent to the pulse motor control circuit 68 for driving the pulse motor 42 and causing the throttle valve 34 to open or close. At the same time a control value based on the outputs of the aforesaid crankshaft angle sensor and intake air pressure sensor is sent to the fuel injection device 32 to control the fuel injection.

As is clear from the foregoing description, the system according to the present invention employs fuzzy logic and thus opens the way to the use as control parameters of the vehicle operating methods employed by an expert driver, since the expert driver's techniques can be analyzed to permit his feelings and impressions to be expressed as the membership degrees and his judgments to be expressed in the form of the control rules. As a result, the invention opens the way to the realization of control which simulates the vehicle operation techniques of the expert driver. Further, as it enables the expression of individual differences in feelings and impression to be expressed as the membership degrees without need for changing the control rules, it makes it possible to enhance each operator's feeling of oneness with the vehicle. Moreover, since it enables results involving large numbers of variables and high-level nonlinear relationships to be converted to linear form, it makes it possible to realize fine control with simple control rules so that the microcomputer 60 need only have a small memory capacity.

For demonstrating the precision obtainable with the system of this invention, there will be described another concrete example. Assume that the vehicle speed difference VDIF is currently zero and the acceleration dV is also zero. This naturally means that there is no need to change the opening of the throttle valve. Now, if a line is drawn vertically upward from the value zero on the universe in FIG. 10(b) it will intersect only with the triangular representation of ZO (the value at the intersection being u=1.0). Then from the rule table of FIG. 11, it is of course found that IF VDIF=ZO AND dV=ZO, THEN $\theta$TH-OUT=ZO. Therefore, as in the case of FIG. 16, if the triangular representations of ZO and ZO are compared, $\mu$=1.0 is found for both VDIF and dV so that the minimum value is also 1.0, meaning that the triangular representation of the ZO of the THEN portion remains in its entirety. However, since the base of this triangular representation has its center at zero on the universe, a vertical line drawn down from the center of gravity G will intersect the universe at the value zero, which means that the control output $\theta$TH-OUT obtained according to FIG. 12 will be zero. Thus the control value is correctly determined.

While the above description discloses preferred embodiments applied to a cruise control, the invention will be further applied to other systems including automatic transmission, steering control, fuel injection and ignition timing.

What is claimed is:

1. A method for controlling vehicle operation, which comprises:
    assigning operating conditions of the vehicle on a scale in advance in accordance with a predetermined first principle while establishing degrees thereof;
    identifying a position on the scale to determine the degree and carrying out a predetermined calculation with respect to the degree;
    selecting or averaging the calculation result in accordance with a predetermined second principle so as to determine a control value corresponding to the selected or averaged value; and
    controlling the vehicle operation on the basis of the value.

2. A method according to claim 1 wherein the vehicle operating conditions are divided into 2n+1 subdivisions, where n is a positive integer.

3. A method according to claim 1 wherein the vehicle operating conditions are assigned on one and the same scale.

4. A method according to claim 1 wherein the averaging is a weighted averaging.

5. A method according to claim 1 wherein the predetermined first principle is to assign the vehicle operation conditions such that they extend from the smallest region to the largest.

6. A method according to claim 1 wherein the predetermined second principle is a mini-max calculation.

7. A method according to claim 1 wherein said vehicle operation control is a cruise control.

8. A method according to claim 7 wherein said vehicle operating conditions are a difference in vehicle speed between a predetermined speed and a current speed, and acceleration of the speed.

9. A system for controlling vehicle operation, which comprises:
    means for detecting operating conditions of the vehicle disposed at an appropriate part of the vehicle;
    means for receiving the output of the detecting means and for calculating a control value required for vehicle operation; and
    means for receiving the output of the calculating means and for driving a device required for vehicle operation;
    said calculating means identifying a current position on a scale onto which operating conditions have been assigned with a degree and calculating a control value with respect to the degree in accordance with a predetermined principle.

10. A system according to claim 9 wherein the predetermined principle is fuzzy set calculation.

11. A system according to claim 9 wherein said vehicle operation control is a cruise control.

12. A system according to claim 10 wherein said vehicle operating conditions are a difference in vehicle speed between a predetermined speed and a current speed, and acceleration of the speed.

* * * * *